(12) United States Patent
Tanabe

(10) Patent No.: US 7,917,566 B2
(45) Date of Patent: Mar. 29, 2011

(54) ARITHMETIC DEVICE CAPABLE OF OBTAINING HIGH-ACCURACY CALCULATION RESULTS

(75) Inventor: Jun Tanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 839 days.

(21) Appl. No.: 11/870,173

(22) Filed: Oct. 10, 2007

(65) Prior Publication Data
US 2008/0256331 A1    Oct. 16, 2008

(30) Foreign Application Priority Data
Oct. 18, 2006   (JP) .................................. 2006-284231

(51) Int. Cl.
*G06F 7/38* (2006.01)
(52) U.S. Cl. ........................................ 708/490; 708/552
(58) Field of Classification Search .................. 708/552, 708/490
See application file for complete search history.

(56) References Cited

U.S. PATENT DOCUMENTS

| | | | |
|---|---|---|---|
| 5,402,368 A * | 3/1995 | Yamada et al. | ............... 708/552 |
| 5,508,951 A | 4/1996 | Ishikawa | |
| 6,151,616 A | 11/2000 | Mahurin | |
| 6,334,135 B2 | 12/2001 | Kabuo | |

FOREIGN PATENT DOCUMENTS

| | | |
|---|---|---|
| JP | 7-146777 | 6/1995 |
| JP | 2001-109613 | 4/2001 |

* cited by examiner

*Primary Examiner* — Tan V Mai
(74) *Attorney, Agent, or Firm* — Oblon, Spivak, McClelland, Maier & Neustadt, L.L.P.

(57) ABSTRACT

A plurality of general-purpose registers each has a first bit width. A computing unit has a first and a second input end, at least the first input end having a second bit width wider than the first bit width, and performs an arithmetical operation on data supplied from the general-purpose registers to the first and second input ends. An overflow register having a bit width narrower than the first bit width holds data on figures overflowed as a result of calculation by the computing unit as overflow data and supplies the held overflow data as higher-order bits to at least one input end of the computing unit.

20 Claims, 3 Drawing Sheets

ARITHMETIC DEVICE CAPABLE OF OBTAINING HIGH-ACCURACY CALCULATION RESULTS

CROSS-REFERENCE TO RELATED APPLICATIONS

This application is based upon and claims the benefit of priority from prior Japanese Patent Application No. 2006-284231, filed Oct. 18, 2006, the entire contents of which are incorporated herein by reference.

BACKGROUND OF THE INVENTION

1. Field of the Invention

This invention relates to an arithmetic device applied to, for example, a microprocessor, and more particularly to an arithmetic device capable of obtaining high-accuracy calculation results.

2. Description of the Related Art

A processor generally reads the data temporarily held in a general-purpose register according to an issued instruction and performs an arithmetical operation. For example, consider a case where expression (1) is calculated on a processor having a 32-bit general-purpose register and a computing unit. Program (2) shows an example of assembler instructions for calculating expression (1):

$$d=(a+b+c) \gg 2 \quad (1)$$

where R0=a, R1=b, R2=c, R5=d

ADD R5,R0,R1

ADD R5,R5,F2

SRL R5,R5,2     (2)

Here, ADD, which is an add instruction, means adding the contents of the general-purpose registers written second and third in the instruction and substituting the result into the general-purpose register written first in the instruction. For example, an ADD instruction written in the first row of program (2) means adding the data held in general-purpose registers R0 and R1 and holding the result in general-purpose register R5. An ADD instruction means adding the data held in general-purpose registers R5 and R2 and holding the result in general-purpose register R5. An SRL instruction is a shift instruction to shift the contents of the general-purpose register written second in the instruction right (or in the LSB direction) a fixed value written third in the instruction and hold the result in the general-purpose register written first in the instruction.

The calculation accuracy when the program is executed with the processor depends on the bit width of the general-purpose register and the bit width of the computing unit. Specifically, when a 32-bit processor adds 32-bit data "a" and 32-bit data "b", this may produce a carry. In this case, the calculation result cannot be held correctly with the 32-bit general-purpose register. As described above, when data that might cause an overflow is dealt with, a general-purpose register and a computing unit whose bit width is greater than 32 bits, for example, a 40-bit general-purpose register and a 40-bit computing unit, have to be used. Recent processors have many general-purpose registers. Accordingly, if the bit width of the general-purpose register and computing unit is set to 40 bits, a problem arises: the occupied area of the general-purpose registers in the processor is large.

In a case where there area 32-bit variables "a," "b", "c", and "d", suppose calculation as shown in equation (3) is made:

$$d=(a+b+c)/4 \quad (3)$$

In this case, although the value of the final calculation result "d" is invariably a value equal or smaller than 32 bits, it can exceed 32 bits in the middle of calculation, depending on the values of "a", "b", and "c". When an overflow occurs only in the middle of calculation, the bit width of the general-purpose register need not necessarily be increased. In this case, the following devices are frequently used: they are an accumulator composed of, for example, a 33-bit pipeline register for holding the intermediate result of the computing unit and a 40 bit×33 bit adder for adding the contents of the 33-bit register and the data in a 40-bit register and causing the 40-bit register to hold the addition result and a selector for selecting the data in either the 40-bit register or the 33-bit register.

Expression (4) shows an example of writing equation (3) in, for example, the C language. Program (5) shows an example of assembler instructions for calculating expression (4).

$$d=(a+b+c) \gg 2 \quad (4)$$

where R0=a, R1=b, R2=c, and R5=d

ACC R0,R1

ACC R2

ACCSRL 2

ACCMOV R5     (5)

In program (5), suppose ACC is an accumulation instruction on an accumulator, ACCSRL is an instruction to shift the contents of the accumulator right a fixed value and load the result into the accumulator again, and ACCMOV is an instruction to copy the contents of the accumulator into a specified general-purpose register. For example, the first row in program (5) means accumulating the data in the general-purpose registers R0 and R1. The second row means further accumulating the data in the general-purpose register R2 to the accumulation result. ACCSRL in the third row means shifting the data in the accumulator right 2 bits. ACCMOV stores the data in the accumulator into the general-purpose register R5.

Using the accumulator enables calculations to be done at high speed using the 40 bit×33 bit adder. In this case, however, the accumulator needs a register whose bit width is large enough to hold the data in the middle of calculation and an adder with the same bit width. Thus, having many accumulators increases the occupied area of the accumulators in the chip. Moreover, an increased number of accumulators increases the number of stages of pipelines, which makes the configuration more complex. Furthermore, there is another problem: an instruction to load the data from the accumulator into a general-purpose register or a memory is needed.

As techniques related to the arithmetic device, Jpn. Pat. Appln. KOKAI Publication No. 2001-109613 has disclosed an arithmetic device comprising a calculation correcting circuit which, when an overflow has occurred in the computing unit, increments or decrements higher-order bits in first input data, and an output data setting circuit, which receives the outputs of the computing unit and calculation correcting circuit and outputs the M-bit calculation result.

Furthermore, Jpn. Pat. Appln. KOKAI Publication No. 07-146777 has disclosed an arithmetic device which makes the calculation accuracy variable and reduces the power consumption by decreasing the number of significant figures.

Accordingly, there has been a demand for an arithmetic device capable of suppressing an increase in the occupied area in the chip and doing high-accuracy calculations even in such a calculation as permits the result in the middle of calculation to exceed the bit width of the general-purpose register.

BRIEF SUMMARY OF THE INVENTION

According to a first aspect of the invention, there is provided an arithmetic device comprising: a plurality of general-purpose registers each of which has a first bit width; a computing unit which has a first and a second input end, at least the first input end having a second bit width wider than the first bit width, and which performs an arithmetical operation on data supplied from the general-purpose registers to the first and second input ends; and at least one overflow register which holds data on figures overflowed as a result of calculation by the computing unit as overflow data and which supplies the held overflow data as higher-order bits to at least one input end of the computing unit.

According to a second aspect of the invention, there is provided an arithmetic device comprising: a plurality of general-purpose registers each of which has a first bit width; a computing unit which has a first and a second input end, at least the first input end having a second bit width wider than the first bit width, and which performs an arithmetical operation on data supplied from the general-purpose registers to the first and second input ends; a register which stores each 1 bit of data overflowed as a result of calculation by the computing unit; a first and a second overflow register which hold data on figures overflowed as a result of calculation by the computing unit as overflow data and which supply the held overflow data as higher-order bits to the first and second ends of the computing unit; an adder which adds the overflow data held in the second and third registers and the 1 bit of data held in the register; and a selector whose first input end is connected to the output end of the adder and whose second input end is connected to the output end of the computing unit and whose output end is connected to the input ends of the first and second overflow registers.

According to a third aspect of the invention, there is provided an arithmetic device comprising: a general-purpose vector register which has an n-bit width (n is a natural number equal to or larger than 1); an m number of first computing units (m is a natural number equal to or larger than 2) which perform an arithmetical operation on data obtained by dividing an n-i bit width (i meets the expression i<n and is an integer equal to or larger than 0) of the general-purpose vector register into equal parts; and at least one overflow register which holds data overflowed as a result of calculation at the first computing units as overflow data and which supplies the held overflow data as higher-order bits to at least one input end of the computing units.

DETAILED DESCRIPTION OF THE INVENTION

Hereinafter, referring to the accompanying drawings, embodiments of the invention will be explained.

First Embodiment

Figure 1:
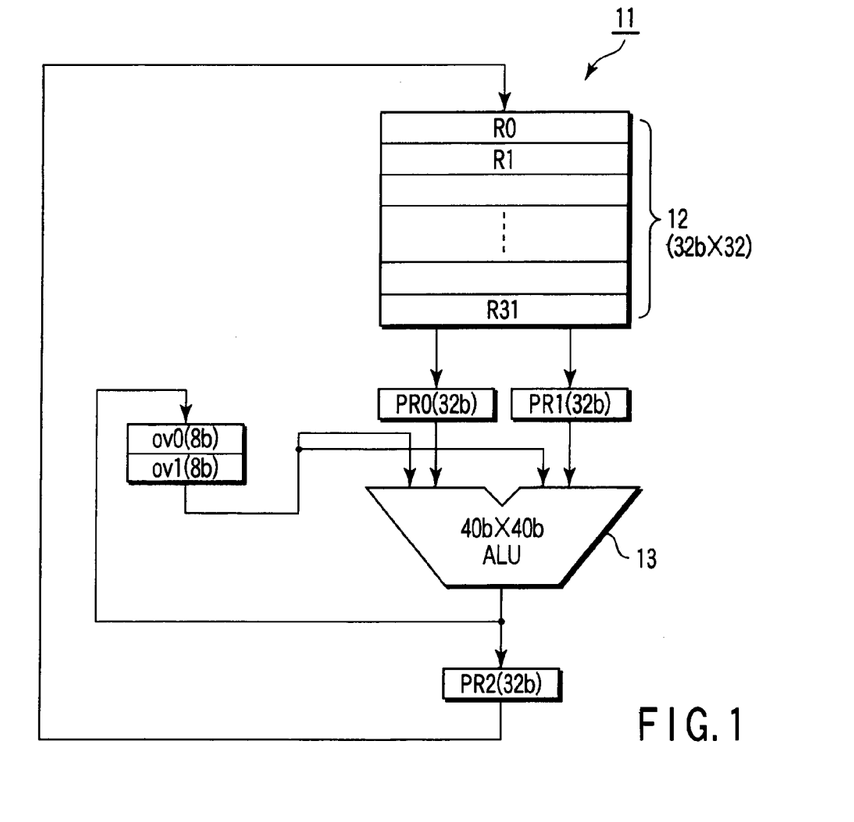
FIG. 1 is a circuit configuration diagram of an arithmetic device according to a first embodiment of the invention.

FIG. 1 shows a first embodiment of the invention. In an arithmetic device 11 of FIG. 1, a general-purpose register unit 12 has, for example, 32 general-purpose registers whose bit width is, for example, 32 bits. That is, the general-purpose register unit 12 has general-purpose registers R0 to R31. The data in the selected general-purpose register is held in pipeline registers PR0, PR1. The registers PR0, PR1 are connected to a first and a second input end of an arithmetic and logic unit (ALU) 12 serving as a computing unit. The bit width of each of the first and second input end of the ALU 13 is, for example, 40 bits. That is, the ALU 13 is designed to be capable of performing an arithmetical operation on 40 bits× 40 bits of data. The output end of the ALU 13 is connected not only to a first and a second overflow register ov0, ov1 but also to a pipeline register PR2.

Each of the first and second overflow registers ov0, ov1 has a width of, for example, 8 bits and stores the high 8 bits in the output data of the ALU 13. The output ends of the first and second overflow registers ov0, ov1 are connected to the high 8 bits at the first and second input ends of the ALU 13, respectively.

The output end of the pipeline register PR2 is connected to the general-purpose register unit 12.

The bit width of each of the first and second input ends of the ALU 13 is not limited to 40 bits. The bit width of each of the first and second overflow registers is not restricted to 8 bits. The bit width of the ALU 13 and first and second overflow registers can be set suitably. The number of overflow registers is not limited to 2 and may be set to more than 2.

In the first embodiment, the ALU 13 performs an arithmetical operation by concatenating the data from the first and second overflow registers ov0, ov1 to the higher-order bits in the data from the general-purpose register. In the example of FIG. 1, the ALU 13 performs an arithmetical operation by concatenating the 8-bit data in the first and second overflow registers ov0, ov1 to the data in the 32-bit general-purpose register to produce 40-bit data. Moreover, of the result of calculation at the ALU 13, the 8 bits higher than the 32 bits are stored in one of the first and second overflow registers ov0, ov1.

The operation when, for example, expression (6) is calculated with the arithmetic device configured as described above will be explained:

$$d=(a+b+c)>>2 \qquad (6)$$

Program (7) shows an example of assembler instructions to calculate expression (6).

ADD{ov0,nul,nul}R5,R0,R1

ADD{ov0,ov0,nul}R5,R5,R2

SRL{nul,ov0,nul}R5,R5,2 (7)

where R0=a, R1=b, R2=c, R5=d

In program (7), "ov0" means using the first overflow register ov0 and "nul" means using neither the first overflow register ov0 nor the second overflow register ov1.

In an ADD instruction in the first row in program (7), since each of the general-purpose registers R0, R1 has a bit width of 32 bits and causes no overflow, neither the first overflow register nor the second overflow register is used. That is, "nul" means using no overflow register. Since the general-purpose register R5 to which the addition result is supplied might generate an overflow, the overflowed data is held in the first overflow register ov0. "ov0" means holding data in the first overflow register ov0.

An ADD instruction in the second row means adding the data in the general-purpose registers R5(a+b) and R2(c) by concatenating the value in the first overflow register ov0 to the higher-order bits in the data in the general-purpose register R5 and holding the calculation result in the general-purpose register R5 again. It further means that the overflowed data is held again in the first overflow register ov0.

An SRL instruction in the third row means concatenating the data in the first overflow register ov0 to the higher-order bits in data (a+b+c) in the general-purpose register R5, shifting the result right, and holding the result in the general-purpose register R5 again. Since the shifted data is guaranteed to be equal to or less than 32 bits, this means that the shifted data is not held in the first overflow register ov0.

Expression (6-1) shows another example of writing expression (6) in, for example, C language.

$$d=(a+b+c)>>2//\text{overflow} \qquad (6\text{-}1)$$

Here, suppose the user has defined "a", "b", "c", and "d" as variables, for example, 32-bit data in integers. "overflow" written to the right of "//" as, for example, a comment means that expression (6-1) generates an overflow in the middle of calculating expression (6-1). When "overflow" has been written, the compiler allocates the first or second overflow register to an instruction that might generate an overflow in the middle of calculation as shown in program (7).

The description of the presence or absence of an overflow is not restricted to a comment form. The description has only to be such that the compiler can determine the presence or absence of an overflow.

Furthermore, the presence or absence of an overflow is not restricted to the definition by the user and may be determined automatically by the compiler, which then may allocate an overflow register.

With the first embodiment, an overflow register to be combined with a general-purpose register is specified (or use of no overflow register is clearly specified) by an instruction from the processor, the data overflowed in the middle of calculation is held in the overflow register, and the data in the overflow register is used again in calculations. Accordingly, even if the bit width, for example, 32-bit width, of the general-purpose register has been exceeded in the middle of calculation, calculations can be done without decreasing the calculation accuracy.

Furthermore, in the first embodiment, increasing the bit width of the ALU 13 and providing an overflow register without increasing the bit width of the general-purpose register suppresses an increase in the occupied area of the arithmetic device in the chip.

Specifically, the overflow register is generally used only when it holds an intermediate calculation result. For this reason, the number of overflow registers smaller than that of general-purpose registers is often sufficient. Although the ALU 13 has to have the bit width that meets the maximum calculation accuracy, the general-purpose registers R0 to R31 need not have the same bit width as that of the ALU 13. They are allowed to have a bit width narrower than that of the ALU 13. Thus, when a case where, for example, 32 40-bit general-purpose registers are arranged in a conventional equivalent is compared with a case where 32 32-bit general-purpose registers and 2 8-bit overflow registers are arranged, this gives the following equation:

$$40\times32-(32\times32+8\times2)=240 \text{ bits}$$

Consequently, with the first embodiment, flip-flops equivalent to 240 bits can be reduced as compared with the conventional equivalent, which enables the chip occupied area of the arithmetic device to be reduced.

In the first embodiment, only the operation examples using an add instruction and a shift instruction have been explained. However, the first embodiment may be applied to all of the arithmetic instructions executed on a general processor.

Second Embodiment

Figure 2:
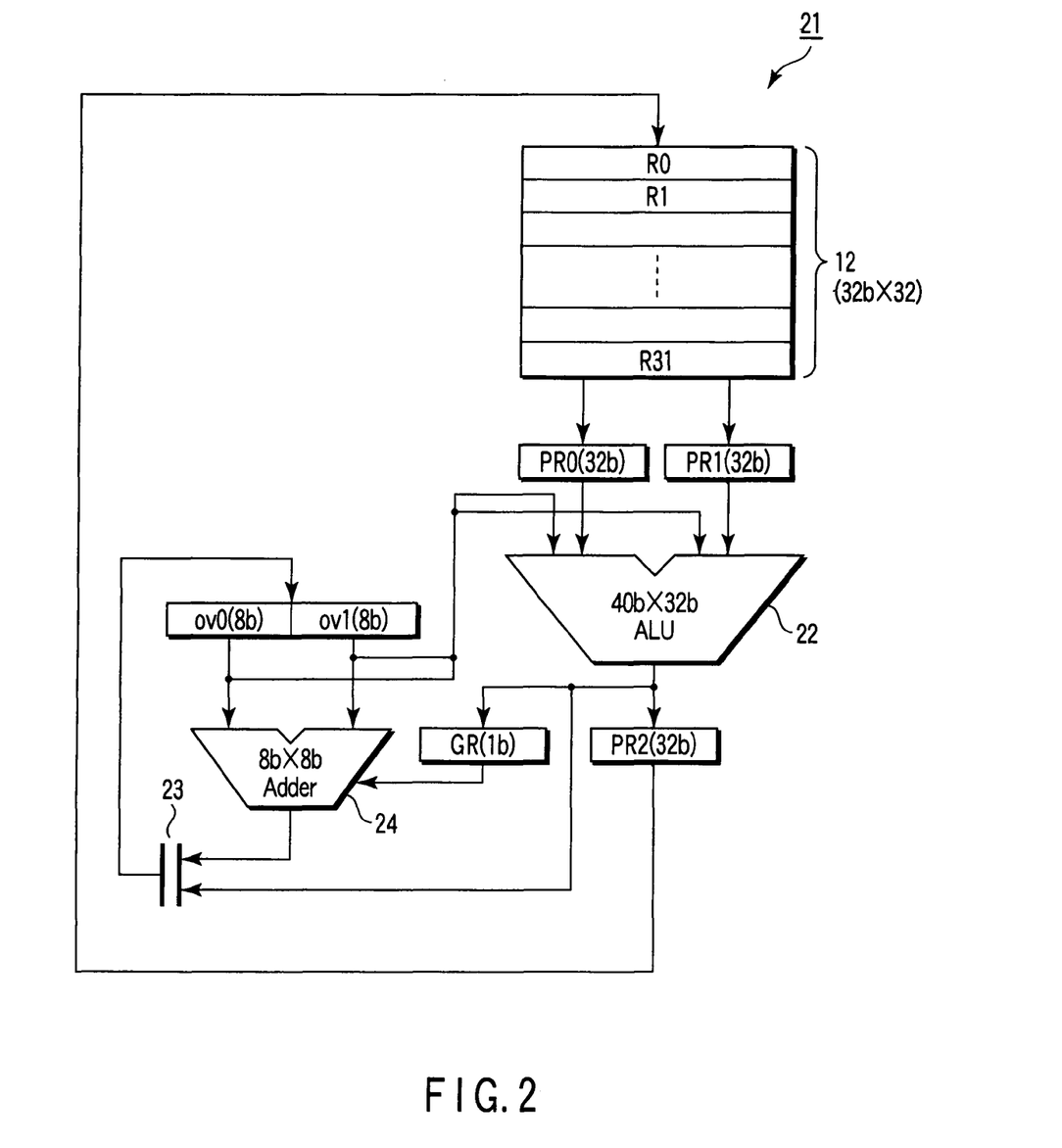
FIG. 2 is a circuit configuration diagram of an arithmetic device according to a second embodiment of the invention.

FIG. 2 shows a second embodiment of the invention. In FIG. 2, the same parts as those in FIG. 1 are indicated by the same reference numerals.

An arithmetic device according to a second embodiment of the invention comprises a general-purpose register unit 12, an ALU 22, a selector 23, an adder 24, a first and a second overflow register ov0, ov1, and a third overflow register GR.

The general-purpose register unit 12 is composed of, for example, 32 general-purpose registers R0 to R31. Each of the general-purpose registers R0 to R31 is made up of 32 bits. A first input end of the ALU 22 is made up of 40 bits and a second input end of the ALU 22 is made up of 32 bits. The output data of a 32-bit pipeline register PR0 and the output data of the first overflow register oV0 containing 8 bits and second overflow register ov1 containing 8 bits are supplied to the first input end. The output data of the 32-bit pipeline register PR0 is supplied to the second input end. The output end of the ALU 22 is connected not only to the input end of a pipeline register PR2 but also to the input end of the third overflow register GR and one input end of the selector 23.

The output end of the pipeline register PR2 is connected to the general-purpose register unit 12. The third overflow register GR is a 1-bit register and holds 1 bit by which the bit width of the general-purpose register has been exceeded in the calculation result of the ALU 22.

Each of a first and a second input end of the adder 24 is made up of 8 bits. The first input end of the adder 24 is connected to the output end of the first overflow register ov0. The second input end of the adder 24 is connected to the output end of the second overflow register ov1. Moreover, the third input end of the adder 24 is connected to the output end of the third overflow register GR. The adder 24 not only adds the data supplied to the first and second input ends but also adds the data supplied to the third input end to the addition result.

The output end of the adder 24 is connected to the other input end of the selector 23. The output end of the selector 23 is connected to the input ends of the first and second overflow registers.

The operation when expression (6) is calculated with the arithmetic device configured as described above will be explained. Program (8) shows an example of assembler instructions to calculate expression (6).

ADD{ov0,nul}R5,R0,R1

ADD{ov0,ov0}R5,R5,R2

SRL{nul,ov0}R5,R5,2         (8)

where R0=a, R1=b, R2=c, R5=d

The second embodiment differs from the first embodiment in that, of the two inputs of the computing unit 22 which calculates the value in a general-purpose register, the data in the first and second overflow registers ov0, ov1 are supplied only to the first input end. For this reason, in the first embodiment, to input two items of data with the maximum calculation accuracy, each of the first and second input ends is made up of 40 bits. In contrast, in the second embodiment, only the first input end is made up of 40 bits and the second input end is composed of the same bit width as that of the general-purpose registers R0 to R31, that is, 32 bits. Consequently, the area of the ALU 22 can be reduced.

In the example of program (8), of the two input ends of the ALU 22, only the first input end enables an overflow register to be specified. Specifically, in the assembler description shown in program (8), only a destination register and a general-purpose register which supplies data to the first input end of the ALU 22 are designed to be capable of specifying an overflow register.

For example, in an ADD instruction written in the first row in program (8), only the general-purpose register R5 acting as a destination register and the general-purpose register R0 which supplies data to the first input end of the ALU 22 are designed to be capable of using an overflow register. However, since the general-purpose register R0 has a 32-bit width in the ADD instruction, it uses no overflow register. That is, "nul" means using no overflow register. On the other hand, since the general-purpose register R5 might generate an overflow, overflowed data has to be held in an overflow register. That is, "ov0" means holding overflowed data in the first overflow register ov0.

In the description in the second row in program (8), "ov0" is written so as to correspond to the general-purpose register R5 acting as a destination register and the general-purpose register R5 which supplies data to the first input end of the ALU 22. That is, the description means that both the general-purpose registers R5, R5 use the first overflow register ov0.

In the description in the third row in program (8), "nul" is written so as to correspond to the general-purpose register acting as a destination register and "ov0" is written so as to correspond to the general-purpose register R5 which supplies data to the first input end of the ALU 22. That is, the description means that, since the general-purpose register R5 which holds the shift result will never generate any overflow, it uses no overflow register.

As a result of performing an arithmetical operation on general-purpose registers at the ALU 22, the third overflow register GR holds 1 bit of data by which the bit width of the general-purpose register has been exceeded. In the middle of calculation, the adder 24 adds the data in the first and second overflow registers ov0, ov1 and the data in the third overflow register GR.

Expression (9) shows a case where an arithmetical operation has to be performed on data items exceeding the bit widths of two general-purpose registers in the middle of calculation.

$$e = ((a*3+b)+(c*3+d)) >> 3 \qquad (9)$$

Program (10) shows an example of assembler instructions to calculate expression (9).

MUL{ov0,nul}R5,R0,3

ADD{ov0,ov0}R5,R5,R1

MUL{ov1,nul}R6,R2,3

ADD{ov1,ov1}R6,R6,R3

ADD{GR,nul}R5,R5,R6 ovadd{ov0,ov1,GR}

SRL{nul,ov0}R5,R5,3 \qquad (10)

where R0=a, R1=b, R2=c, R3=d, and R6=e

A MUL (multiplication) instruction in the first row in program (10) means multiplying the data "a" in the general-purpose register R0 by the fixed number "3", storing the calculation result "a*3" in the general-purpose register R5, and holding the higher-order bits overflowed from the general-purpose register R5 in the first overflow register ov0.

An ADD instruction in the second row means adding the data "a*3" in the general-purpose register R5 and the data "b" in the general-purpose register R1, holding the calculation result "a*3+b" in the general-purpose register R5, and holding the higher-order bits in the general-purpose register R5 in the first overflow register ov0.

A MUL instruction in the third row means multiplying the data "c" in the general-purpose register R2 by the fixed number "3", storing the calculation result "c*3" in the general-purpose register R6, and holding the higher-order bits overflowed from the general-purpose register R6 in the second overflow register ov1.

An ADD instruction in the fourth row means adding the data "c*3" in the general-purpose register R6 and the data "d" in the general-purpose register R3, holding the calculation result "c*3+d" in the general-purpose register R6, and holding the higher-order bits in the general-purpose register R6 in the second overflow register ov1.

When the ADD instruction in the fourth row has been executed, the calculation result "a*3+b" is held in the general-purpose register R5 and the calculation result "c*3+d" is held in the general-purpose register R6. Moreover, the higher-order bits in the general-purpose register R5 are held in the first overflow register ov0 and the higher-order bits in the general-purpose register R6 are held in the second overflow register ov1.

An ADD instruction in the fifth row means adding the data in the general-purpose registers R5 and R6, storing the calculation result in the general-purpose register R5, and storing 1-bit overflow data in the third overflow register GR. Specifically, when (a*3+b) and (c*3+d) are added, two values exceeding 32 bits are added and the calculation result, 1 bit, is stored in the third overflow register GR.

An ovadd instruction in the sixth row, which is an instruction to the adder 24, means that the adder 24 adds the data in the first and second overflow registers ov0, ov1 and the data in the third overflow register GR sequentially and stores the result in the first overflow register ov0. As a result, the calculation result of the higher-order bits in R5+R6 is substituted into the first overflow register ov0 and the value obtained by concatenating the data in the first overflow register ov0 and the result of the general-purpose register R5 is the result of (a*3*b)+(c*3+d).

Figure 3:
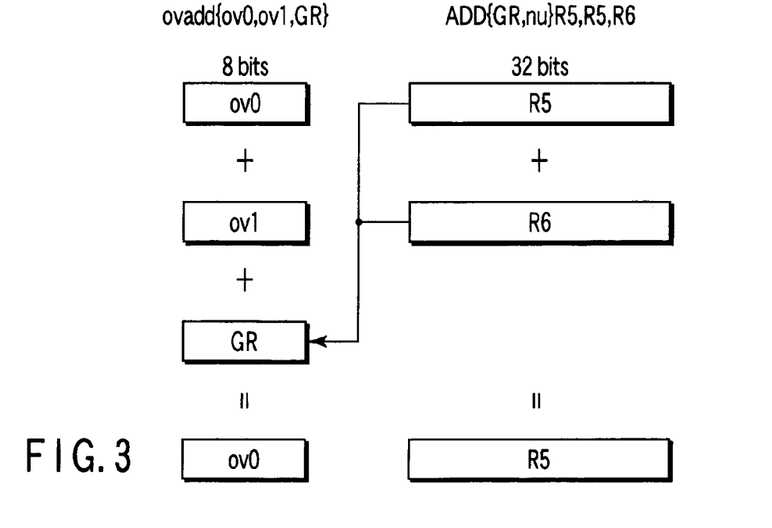
FIG. 3 schematically shows the operation of the second embodiment.

FIG. 3 schematically shows the operation of concatenating the data in the general-purpose register R5 holding the calculation result of ADD {GR, nul} R5, R5, R6 and the data in the first overflow register ov0 holding the calculation result of ovadd {ov0, ov1, GR}.

An SRL instruction in the seventh row means shifting the data in the general-purpose register R5 and the data in the first overflow register ov0 right 3 bits and storing the result in the general-purpose register R5.

In the second embodiment, the third overflow register GR for holding the high 1 bit in the ALU and the adder 24 for adding the data in the first and second overflow registers ov0, ov1 and the data in the third overflow register GR have been provided. This makes it possible to combine the 40 bit×32 bit ALU 22 with the 8 bits×8 bit adder 24, which enables 40 bits and 40 bits to be added. The area of the combination of the 40 bits×32 bit ALU 22 and the 8 bits×8 bit adder 24 is generally smaller than the area of a 40 bits×40 bits ALU. Accordingly, the occupied area of the arithmetic device in the chip can be reduced.

Furthermore, in the second embodiment, the data in the first and second overflow registers ov0, ov1 are supplied only to the first input end of the ALU 22. Therefore, the fields for specifying overflow registers in an instruction format can be reduced as compared with in the first embodiment.

Third Embodiment

Figure 4:
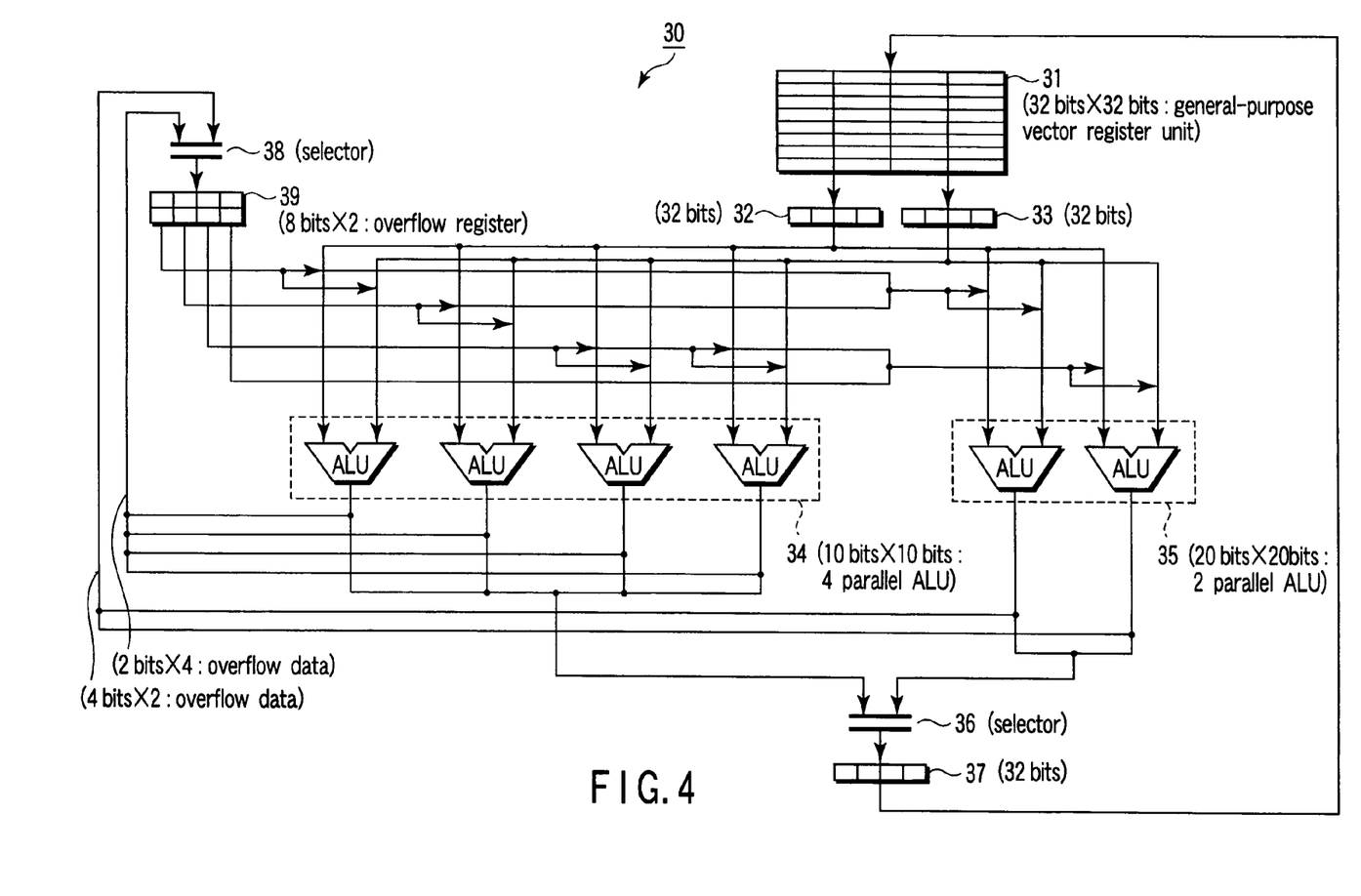
FIG. 4 is a circuit configuration diagram of an arithmetic device according to a third embodiment of the invention.

FIG. 4 shows a third embodiment of the invention. The third embodiment differs from the first and second embodiments in that the general-purpose register and ALU are configured so as to carry out an SIMD (Single Instruction Multiple Data) operation.

In an SIMD arithmetic device 30 of FIG. 4, a general-purpose vector register unit 31 is a register which is capable of holding SIMD data and has a bit width of 32 bits×32 bits. The general-purpose vector register unit 31 is connected to the input ends of pipeline registers 32, 33. Each of the pipeline registers 32, 33 has a bit width of 32 bits.

The output ends of the pipeline registers 32, 33 are connected to a 4 parallel ALU 34 and a 2 parallel ALU 35. The 4 parallel ALU 34 includes four ALUs a first and a second input end of each of which are each made up of, for example, 10 bits. The output data of the pipeline register 32 is supplied to the first input end of each ALU. The output data of the pipeline register 33 is supplied to the second input end of each ALU. Moreover, the 2 parallel ALU 35 includes two ALUs a first and a second input end of each of which are each made up of, for example, 20 bits. The output data of the pipeline register 32 is supplied to the first input end of each ALU. The output data of the pipeline register 33 is supplied to the second input end of each ALU. The output end of the 4 parallel ALU 34 and the output end of the 2 parallel ALU 35 are connected to the input ends of a selector 36.

The selector 36 has a bit width of 32 bits. Of the 10-bit data output from each of the ALUs constituting the 4 parallel ALU 34, the low 8 bits are supplied to the selector 36. Moreover, of the 20-bit data output from each of the ALUs constituting the 2 parallel ALU 35, the low 16 bits are supplied to the selector 36. The selector 36 selects either the 32-bit data supplied from the 4 parallel ALU 34 or the 32-bit data supplied from the 2 parallel ALU 35. The output end of the selector 36 is connected to the input end of the pipeline register 37. The pipeline register 37 has a bit width of 32 bits. The output end of the pipeline register 37 is connected to the general-purpose vector register unit 31.

Furthermore, the high 2 bits in the 10-bit data output from each of the ALUs constituting the 4 parallel ALU 34 and the high 4 bits in the 20-bit data output from each of the ALUs constituting the 2 parallel ALU 35 are supplied to a selector 38. The selector 38 has a bit width of, for example, 8 bits, and selects either the 8-bit data supplied from the 4 parallel ALU 34 or the 8-bit data supplied from the 2 parallel ALU 35. The output end of the selector 38 is connected to the input ends of the first and second overflow registers ov0, ov1.

Each of the first and second overflow registers ov0, ov1 has a bit width of 8 bits and holds 8-bit data supplied from the selector 38. The 8-bit data output from the first and second overflow registers ov0, ov1 are supplied in units of 2 bits to the first and second input ends of each of the ALUs constituting the 4 parallel ALU 34. Moreover, the 8-bit data output from the first and second overflow registers ov0, ov1 are supplied in units of 4 bits to the first and second input ends of each of the ALUs constituting the 2 parallel ALU 35.

With the above configuration, when an 8 bits×4 parallel SIMD arithmetical operation is carried out at the first and second overflow registers ov0, ov1 each containing 8 bits, an overflow in each of the four calculation results can be stored in units of 2 bits. Moreover, when a 16 bits×2 parallel SIMD arithmetical operation is carried out at the first and second overflow registers ov0, ov1, an overflow in each of the two calculation results can be stored in units of 4 bits.

Hereinafter, the operation of carrying out an 8 bits×4 parallel SIMD arithmetical operation will be explained.

When the arithmetical operation is performed, the general-purpose vector register unit 31 has 32 bits divided into 8 bits×4 and supplies each of the 8-bit data items to the individual ALUs of the 4 parallel ALU 34. In calculation at the 4 parallel ALU 34, when the first and second overflow registers ov0, ov1 are not used, that is, when the definition of variables has been followed, 8-bit data is extended to 10-bit data for use. When the first and second overflow registers ov0, ov1 are used, units of 2 bits corresponding to the four computing units in the 8-bit data stored in the first and second overflow registers ov0, ov1 are used as the high 2 bits in the 10-bit input data.

In the 10-bit data output from each of the four ALUs, when the calculation result is not held in the first or second overflow register ov0, ov1, the high 2 bits in the 10-bit data are discarded. When the calculation result is held in the first or second overflow register ov0, ov1, the high 2 bits are combined in the individual 10-bit data items to produce 8-bit data, which is held in the first or second overflow register. In the 10-bit data output from each of the four ALUs, the low 8 bits are combined to 32-bit data. The result is held in a general-purpose register specified by the general-purpose vector register unit 31.

Expressions (11) show examples of expressions applied to SIMD arithmetical operations.

$$d0=(a0+b0+c0)>>2$$

$$d1=(a1+b1+c1)>>2$$

$$d2=(a2+b2+c2)>>2$$

$$d3=(a3+b3+c3)>>2 \quad (11)$$

Program (12) shows examples of assembler instructions when expressions (11) are calculated by performing an 8 bits×4 parallel SIMD arithmetical operation:

ADD.b{ov0,nul,nul}VR5,VR0,VR1

ADD.b{ov0,ov0,nul}VR5,VR5,VR2

SRL.b{nul,ov0,nul}VR5,VR5,2    (12)

where ADD.b (b:byte) and SRL.b are 8 bits×4 parallel SIMD arithmetical operations, ADD.b is an add instruction, and SRL.b is a logical right shift instruction. VR0 to VR5 are general-purpose vector registers. Specifically, they are as follows:

VR0=[a0,a1,a2,a3]

VR1=[b0,b1,b2,b3]

VR2=[c0,c1,c2,c3]

VR5=[d0,d1,d2,d3]

Next, the operation of an 8 bits×4 parallel SIMD arithmetical operation will be explained.

When the arithmetical operation is carried out, the contents of the 32-bit general-purpose vector register are divided into 8 bits×4. The 8-bit data is supplied to each of the ALUs constituting the 4 parallel ALU 34. Specifically, in the case of an ADD.b instruction in the first row in program (12), the data in the general-purpose vector registers VR0, VR1 are added at the 4 parallel ALU 34. Since an overflow can occur in the general-purpose vector register VR5 holding the calculation result, the first overflow register ov0 has been specified.

In an 8 bit×4 parallel SIMD arithmetical operation, when the first or second overflow register ov0 or ov1 is used, the data are divided into units of 2 bits for the first or second overflow register ov0 or ov1 containing 8 bits. The high 2 bits in the calculation result in each of the ALUs constituting the 4 parallel ALU 34 are held in the first overflow register ov0 in units of 2 bits.

On the other hand, 8-bit data output from each of the four ALUs is combined via the selector 36 and pipeline register 37 to 32-bit data. The result is held in the general-purpose vector register VR5 specified by the general-purpose vector register unit 31.

In the case of an ADD.b instruction in the second row in program (12), the data in the general-purpose vector register VR5 and the data in VR2 are added. At this time, four 2-bit data items supplied from the first overflow register ov0 are concatenated to the higher-order bits in the four data items supplied from the general-purpose vector register VR5 to produce 10-bit data, which is supplied to one input end of each of the four ALUs. In the case of the ADD instruction, too, the high 2 bits in the calculation result in each of the ALUs are held in the first overflow register ov0 in units of 2 bits. Moreover, in the calculation result at each of the ALUs, 8 bits are combined to produce 32-bit data, which is held in the general-purpose vector register VR5 specified by the general-purpose vector register unit 31.

In the case of an SRL.b instruction in the third row in program (12), units of 2 bits in the first overflow register ov0 are combined with the higher-order bits in four data items in the general-purpose vector register R5 to produce 10-bit data, which is supplied to one input end of each of the four ALUs. Since no overflow occurs in the calculation result of the SRL.b instruction, 8-bit data output from each of the four ALUs are combined. The resulting data is stored in the general-purpose vector register VR5.

In the above explanation, an 8 bit×4 parallel SIMD arithmetical operation has been explained. In the case of a 16 bit×2 parallel SIMD arithmetical operation, the first and second overflow registers ov0, ov1 are divided into units of 4 bits. In the result of a 20 bit×20 bit ALU arithmetical operation, the high 4 bits are held. The data held in the first and second overflow registers ov0, ov1 are combined with the higher-order bits in the data supplied from the general-purpose vector register. The resulting data is supplied to the specified ALU.

When neither the first overflow register ov0 nor the second overflow register ov1 is used, 8-bit data is extended to 10-bit data and 16-bit data is extended to 20-bit data.

Furthermore, when the calculation result is not held in the first or second overflow register ov0 or ov1, the high 2 bits in the 10-bit data output from each of the four ALUs are discarded and the high 4 bits in the 20-bit data output from each of the two ALUs are discarded.

An SIMD operation of a conventional SIMD computing unit is often restricted because the accuracy of the data in the middle of calculation decreases. For example, in an 8 bit×4 parallel SIMD arithmetical operation, a signed variable can take a value only in the range of −128 to 127. Therefore, when the result in the middle of calculation has exceeded this value, the result in the middle of calculation is generally extended to 16-bit data, which is then subjected to an operation. In this case, only a 16 bit×2 parallel SIMD arithmetical operation can be performed, which decreases the performance significantly. There is still another problem: an instruction to extend 8-bit data to 16-bit data is needed.

In contrast, with the third embodiment, use of the first and second overflow registers ov0, Ov1 makes it possible to perform an 8 bit×4 parallel SIMD arithmetical operation or a 16 bit×2 parallel SIMD arithmetical operation without changing the bit width of data in the middle of calculation. Moreover, the first and second overflow registers ov0, ov1 and selector 38 occupy a small area. Therefore, the performance of an SIMD arithmetical operation can be improved by increasing their area slightly in the chip.

In the third embodiment, the combination of the first and second overflow registers ov0, ov1 with the SIMD arithmetic circuit has been explained as in the first embodiment. The invention is not limited to this. For instance, as in the second embodiment, a third overflow register for holding the high 1 bit in each of the ALUs may be combined with an adder which adds the data in the first and second overflow registers and the data in the third overflow register.

While in the SIMD arithmetic circuit, a 2 parallel circuit and a 4 parallel circuit, a total of two circuits, have been used, the invention is not limited to this. For instance, an 8 parallel circuit may be used or a 2 parallel circuit, a 4 parallel circuit, and an 8 parallel circuit, a total of three circuits, may be used. Generally, it is possible to use one or more sets of $2^n$ (n is a natural number equal to or larger than 1) arithmetic circuits which perform an arithmetical operation on data obtained by dividing the bit width of a general-purpose vector register into $2^n$ equal parts. It goes without saying that the number of parallels and the number of parallel circuits may be changed according to the bit width of the general-purpose vector register and the calculation accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An arithmetic device comprising:
   a plurality of general-purpose registers each of which has a first bit width;
   a computing unit which has a first and a second input end, at least the first input end having a second bit width wider than the first bit width, and which performs an arithmetical operation on data supplied from the general-purpose registers to the first and second input ends; and
   at least one overflow register which holds data on figures overflowed as a result of calculation by the computing unit as overflow data and which supplies the held overflow data as higher-order bits to at least one input end of the computing unit.

2. The arithmetic device according to claim 1, wherein the overflow register supplies the held overflow data as overflow data to the first and second input ends of the computing unit.

3. The arithmetic device according to claim 1, wherein said plurality of general-purpose registers are each composed of 32 bits.

4. The arithmetic device according to claim 1, wherein the first and second input ends of the computing unit are each composed of 40 bits.

5. The arithmetic device according to claim 1, wherein the overflow register is composed of 8 bits and holds the high 8 bits of data output from the computing unit.

6. The arithmetic device according to claim 1, further comprising:
a first and a second pipeline register which are each connected between said plurality of general-purpose registers and the first and second input ends of the computing unit; and
a third pipeline register which is connected between the output end of the computing unit and said plurality of general-purpose registers.

7. An arithmetic device comprising:
a plurality of general-purpose registers each of which has a first bit width;
a computing unit which has a first and a second input end, at least the first input end having a second bit width wider than the first bit width, and which performs an arithmetical operation on data supplied from the general-purpose registers to the first and second input ends;
a register which stores a 1 bit of data overflowed as a result of calculation by the computing unit;
a first and a second overflow register which hold data on figures overflowed as a result of calculation by the computing unit as overflow data and which supply the held overflow data as higher-order bits to the first and second ends of the computing unit;
an adder which adds the overflow data held in the second and third registers and the 1 bit of data held in the register; and
a selector whose first input end is connected to the output end of the adder and whose second input end is connected to the output end of the computing unit and whose output end is connected to the input ends of the first and second overflow registers.

8. The arithmetic device according to claim 7, wherein said plurality of general-purpose registers are each composed of 32 bits.

9. The arithmetic device according to claim 7, wherein the first and second input ends of the computing unit are each composed of 40 bits.

10. The arithmetic device according to claim 7, wherein the first and second overflow registers are each composed of 8 bits and hold the high 8 bits of data output from the computing unit.

11. The arithmetic device according to claim 7, further comprising:
a first and a second pipeline which are each connected between said plurality of general-purpose registers and the first and second input ends of the computing unit; and
a third pipeline which is connected between the output end of the computing unit and said plurality of general-purpose registers.

12. An arithmetic device comprising:
a general-purpose vector register which has an n-bit width (n is a natural number equal to or larger than 1);
an m number of first computing units (m is a natural number equal to or larger than 2) which perform an arithmetical operation on data obtained by dividing an n-i bit width (i meets the expression i<n and is an integer equal to or larger than 0) of the general-purpose vector register into equal parts; and
at least one overflow register which holds data overflowed as a result of calculation at the first computing units as overflow data and which supplies the held overflow data as higher-order bits to at least one input end of the computing units.

13. The arithmetic device according to claim 12, further comprising:
a k number of second computing units (k meets the expression k<m and is a natural number equal to or larger than 1) which perform an arithmetical operation on data obtained by dividing an n-j bit width (j meets the expressions j>i and j+i<n and is a natural number equal to or larger than 1) of the general-purpose vector register into equal parts.

14. The arithmetic device according to claim 13, further comprising:
a first selector whose first input end is connected to the output end of each of the first computing units and whose second input end is connected to the output end of each of the second computing units and whose output end is connected to the input end of the overflow register.

15. The arithmetic device according to claim 13, further comprising:
a second selector whose first input end is connected to the output end of each of the first computing units and whose second input end is connected to the output end of each of the second computing units and whose output end is connected to the input end of the overflow register.

16. The arithmetic device according to claim 15, further comprising:
a first and a second pipeline register which are each connected between the general-purpose vector register and the first and second input ends of each of the first and second computing units; and
a third pipeline register which is connected between the output end of the second selector and the general-purpose vector register.

17. The arithmetic device according to claim 13, further comprising:
the general-purpose vector register and the first and second computing units constitute an SIMD (Single Instruction Multi Data) computing circuit.

18. The arithmetic device according to claim 17, wherein the general-purpose vector register is composed of 32 bits×32 bits.

19. The arithmetic device according to claim 17, wherein the first and second input ends of the first computing unit are each composed of 10 bits and the first and second input ends of the second computing unit are each composed of 20 bits.

20. The arithmetic device according to claim 12, wherein the overflow register is composed of 8 bits×2.

* * * * *